United States Patent [19]
Yong

[11] Patent Number: 6,088,021
[45] Date of Patent: Jul. 11, 2000

[54] PERIPHERAL INPUT DEVICE HAVING A RETRACTABLE CORD

[75] Inventor: Edward G. Yong, Sioux City, Iowa

[73] Assignee: Gateway, Inc., N. Sioux City, S. Dak.

[21] Appl. No.: 09/089,988

[22] Filed: Jun. 3, 1998

[51] Int. Cl.[7] ............................................. G09G 5/08
[52] U.S. Cl. ..................... 345/163; 345/160; 345/161; 345/163; 345/168
[58] Field of Search ............. 345/156, 40, 179; 361/683–686; 341/22

[56] References Cited

U.S. PATENT DOCUMENTS

| | | | |
|---|---|---|---|
| 1,222,376 | 4/1917 | Ferguson | 191/12.2 R |
| 3,022,089 | 2/1962 | Botar | 280/802 |
| 3,439,428 | 4/1969 | Zelnick | 242/371 |
| 3,835,464 | 9/1974 | Rider | 340/324 |
| 3,987,685 | 10/1976 | Opocensky | 74/471 R |
| 4,940,859 | 7/1990 | Peterson | 191/12.4 |
| 4,946,010 | 8/1990 | DiBono | 191/12.2 |
| 5,102,061 | 4/1992 | Suzuki et al. | 242/54 R |
| 5,414,445 | 5/1995 | Kaneko et al. | 345/163 |
| 5,490,039 | 2/1996 | Helms | 361/683 |
| 5,490,805 | 2/1996 | Bredesen | 441/75 |
| 5,528,690 | 6/1996 | Shahrebani | 379/438 |
| 5,530,455 | 6/1996 | Gillick et al. | 345/163 |
| 5,590,749 | 1/1997 | Wagner et al. | 191/12.4 |

*Primary Examiner*—Dennis-Doon Chow
*Attorney, Agent, or Firm*—Suiter & Associates PC; Anthony Claiborne

[57] ABSTRACT

A peripheral input device having a retractable cord operably coupling the device to a computer system is disclosed. A reel assembly disposed within the body of the peripheral input device allows the cord to be alternately extended and retracted as desired by the user. The reel assembly may include a stop mechanism for limiting tension on the cord while the device is being manipulated by the user.

32 Claims, 7 Drawing Sheets

PERIPHERAL INPUT DEVICE HAVING A RETRACTABLE CORD

FIELD OF THE INVENTION

The present invention relates generally to computer systems, and more specifically to peripheral input devices commonly used for entering information and commands into a computer system.

BACKGROUND OF THE INVENTION

Peripheral input devices are well known to the art for entering information and commands into a computer system. Such peripheral input devices include, for example, keyboard type input devices (e.g., keyboards, keypads, etc.) which are commonly used for entry of alphanumeric data or information and absolute coordinate input devices (e.g., mouse, trackballs, tracksticks, joysticks, touchpads, etc.) which control the position of a cursor on the computer system's display by providing position indications corresponding to positions on the display. For example, perhaps the most widely used absolute coordinate position input device, often referred to in the art as a "mouse," comprises a body generally shaped to fit within the hand of a user. A rotatable ball extends from a bottom surface of the body for contacting a work surface such as a table top, mouse pad, or the like whereupon movement of the body across the work surface causes rotation of the ball. Electronic encoders sense the rotation of the ball and generate a signal indicative of the ball's rotation to control movement of the cursor displayed on the display. The mouse may also have one or more depressible keys or buttons disposed on a top surface of the body. Depressing one of these buttons permits a user to enter various commands into the computer based on the location of the cursor. For example, depressing a button may highlight text in a word processing program, pull down a menu, open and close files, or select files for to be copied or deleted.

Peripheral input devices are typically coupled to the computer via a cord or cable extending from the device to a port located on the back of the computer's housing. This cord is preferably of sufficient length to allow the input device to be comfortably manipulated by the user (e.g., approximately 2 meters (6.5 feet) for a conventional mouse). Because of its length, however, the cord may become tangled with other cords or cables causing the input device to be difficult to use or manipulate. This may result in erroneous information or commands being entered into the computer. Additionally, excess cord may cause the area around the computer to appear cluttered and may interfere with the performance of other tasks which do not involve use of the computer system.

Consequently, it would be advantageous to provide a peripheral input device such as a mouse, keyboard, trackball, trackstick, touchpad, or the like having a retractable cord wherein the device may be readily coupled to a computer without requiring substantial modification of the computer.

SUMMARY OF THE INVENTION

Accordingly, the present invention is directed to a novel peripheral input device having a retractable cord or cable for operatively coupling the device to a computer. The peripheral input device includes an input device which comprises a body having a reel assembly internally disposed therein. The reel assembly allows the cord to be extended and retracted between a first length and a second length. The reel assembly comprises a spool rotatably disposed within the body of the input device. A spring rotates the spool to receive the cord wherein the cord is at least partially coiled around the spool when the cord is retracted from the first length to the second length. The reel assembly may further include a stop mechanism which allows the cord to be held at a fixed length. The stop mechanism also limits tension in the cord due to the spring so that the peripheral input device may be more easily used or manipulated.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1A:
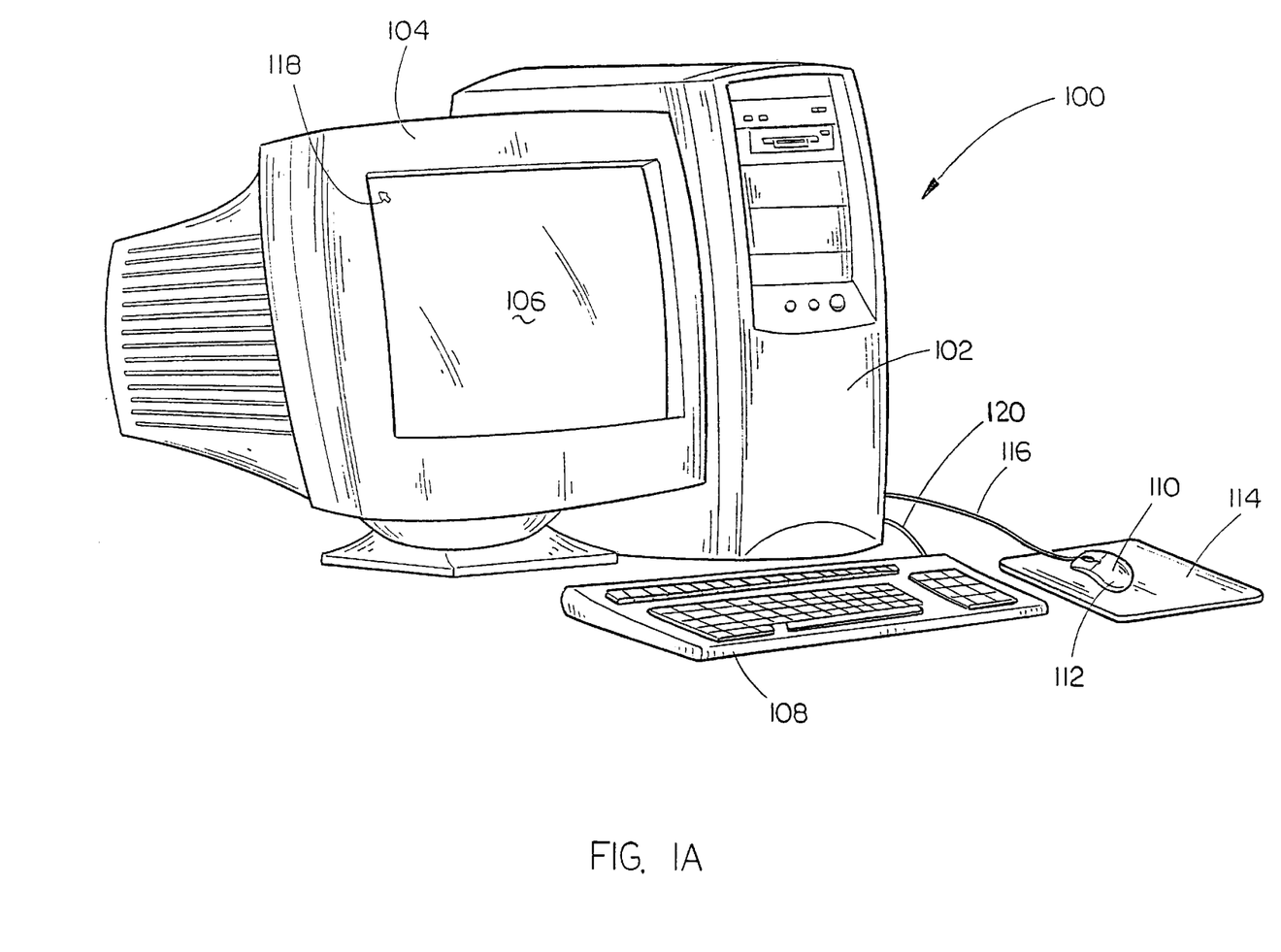
FIG. 1A is an isometric view of a computer system including a peripheral input device having a retractable cord in accordance with an exemplary embodiment of the present invention.

Referring now to FIG. 1A, a computer system employing one or more peripheral input devices having a retractable cord in accordance with an exemplary embodiment of the present invention is shown. The computer system 100 may employ one or more peripheral input devices 108 & 110, each having a cord or cable 116 & 120 operatively coupling the device 108 & 110 to the computer system 100 via ports (not shown) located on the back surface of the computer system's chassis or housing 102. For example, as shown in FIG. 1A, the computer system 100 may include a keyboard type input device such as keyboard 108 for entering alphanumeric data, information, and commands. The computer system 100 may also include an absolute coordinate input device such as mouse 110. Such a mouse 110 preferably comprises a body 112 which is movable over a surface 114 such as a mouse pad, table top, desk top, or the like for providing position indications corresponding to positions on the display area 106 of a display 104. In this manner, the mouse 110 may control movement of a cursor or pointer 118 within the display area 106 so that a user may enter information and commands into the computer system 100 based on the position of the cursor 118.

Figure 1B:
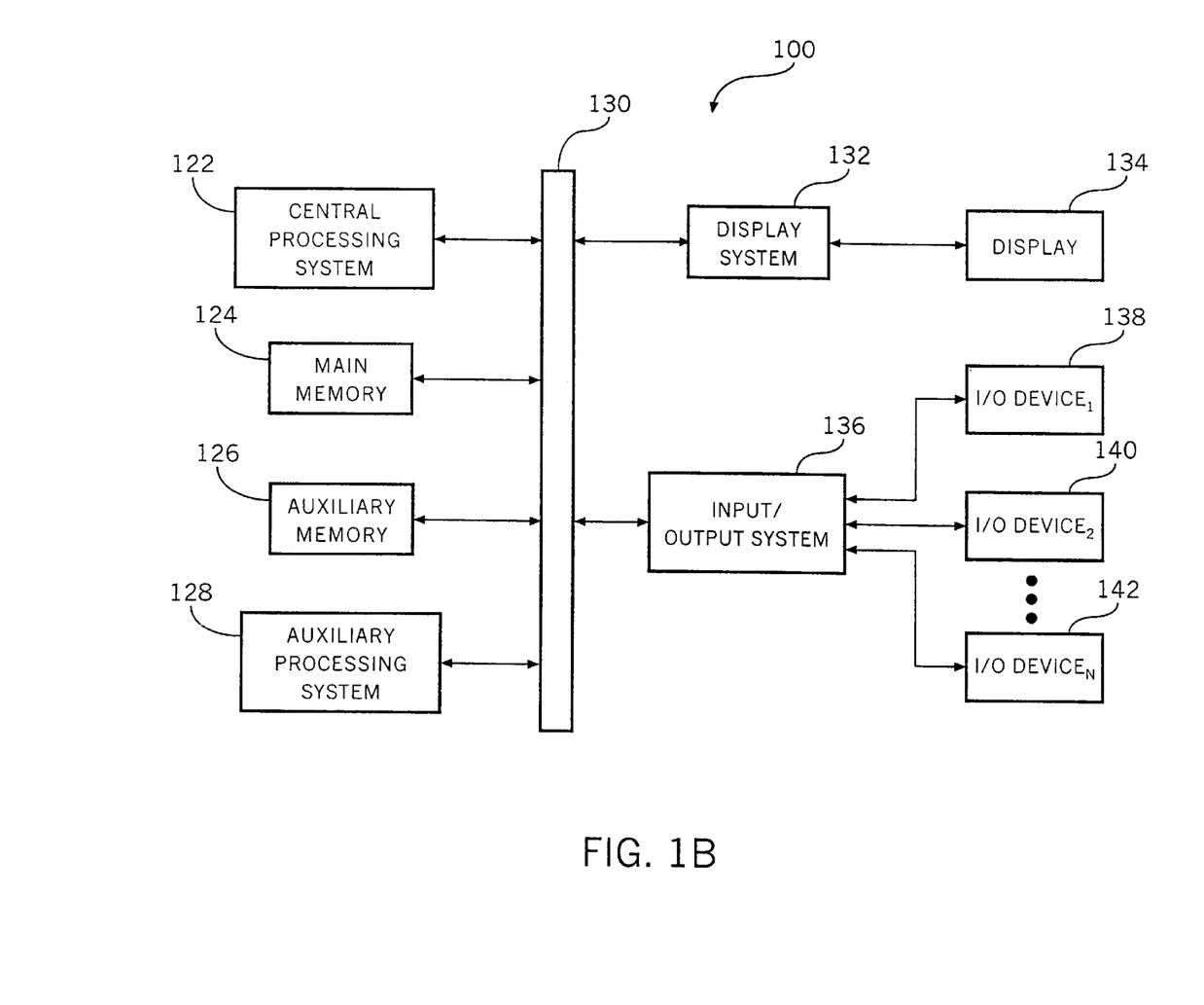
FIG. 1B is a block diagram depicting a typical hardware environment of a computer system such as the computer system shown in FIG. 1A.

Referring now to FIG. 1B, a block diagram of the computer system depicted in FIG. 1A is shown. The computer system 100 is controlled by a central processing system 122. The central processing system 122 includes a central processing unit such as a microprocessor or microcontroller for executing programs, performing data manipulations and controlling the tasks of the computer system 100. Communication with the central processing system 122 is implemented through a system bus 130 for transferring information among the components of the computer system 100. The bus 130 may include a data channel for facilitating information transfer between storage and other peripheral components of the hardware system. The bus 130 further provides the set of signals required for communication with the central processing system 122 including a data bus, address bus, and control bus. The bus 130 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the computer system 100 include main memory 124, auxiliary memory 126, and an auxiliary processing system 128 as required. The main memory 124 provides storage of instructions and data for programs executing on the central processing system 122. The main memory 124 is typically semiconductor based memory such as dynamic random access memory (DRAM) and or static random access memory (SRAM). The auxiliary memory 126 provides storage of instructions and data that are loaded into the main memory 124 before execution. The auxiliary memory 126 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 126 may also include a variety of non-semiconductor based memories, including but not limited to magnetic tape, drum, floppy disk, hard disk, optical, laser disc, compact disc read-only memory (CD-ROM), digital versatile disc read-only memory (DVD-ROM), digital versatile disc random-access memory (DVD-RAM), etc. Other varieties of memory devices are contemplated as well. The computer system 100 may optionally include an auxiliary processing system 128 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The computer system 100 further includes a display system 132 for connecting to a display 134 (such as display 104 shown in FIG. 1A), and an input/output (I/O) system 136 for connecting to one or more I/O devices 138, 140 up to N number of I/O devices 142. The display system 132 may comprise a video display adapter having all of the components for driving the display device, including video random access memory (VRAM), buffer, and graphics engine as desired. The display 134 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 136 may comprise one or more controllers or adapters for providing interface functions between the one or more I/O devices 138–142. For example, the input/output system 136 may comprise a serial port, parallel port, infrared port, network adapter, printer adapter, radio-frequency (RF) communications adapter, universal asynchronous receiver-transmitter (UART) port, etc., for interfacing between corresponding I/O devices such as amouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 136 and I/O devices 138–142 may provide or receive analog or digital signals for communication between the computer system 100 of the present invention and external devices, networks, or information sources. The input/output system 136 and I/O devices 138–142 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the computer system 100 of FIG. 1B by one having ordinary skill in the art would not depart from the scope or the spirit of the present invention.

Figure 2:
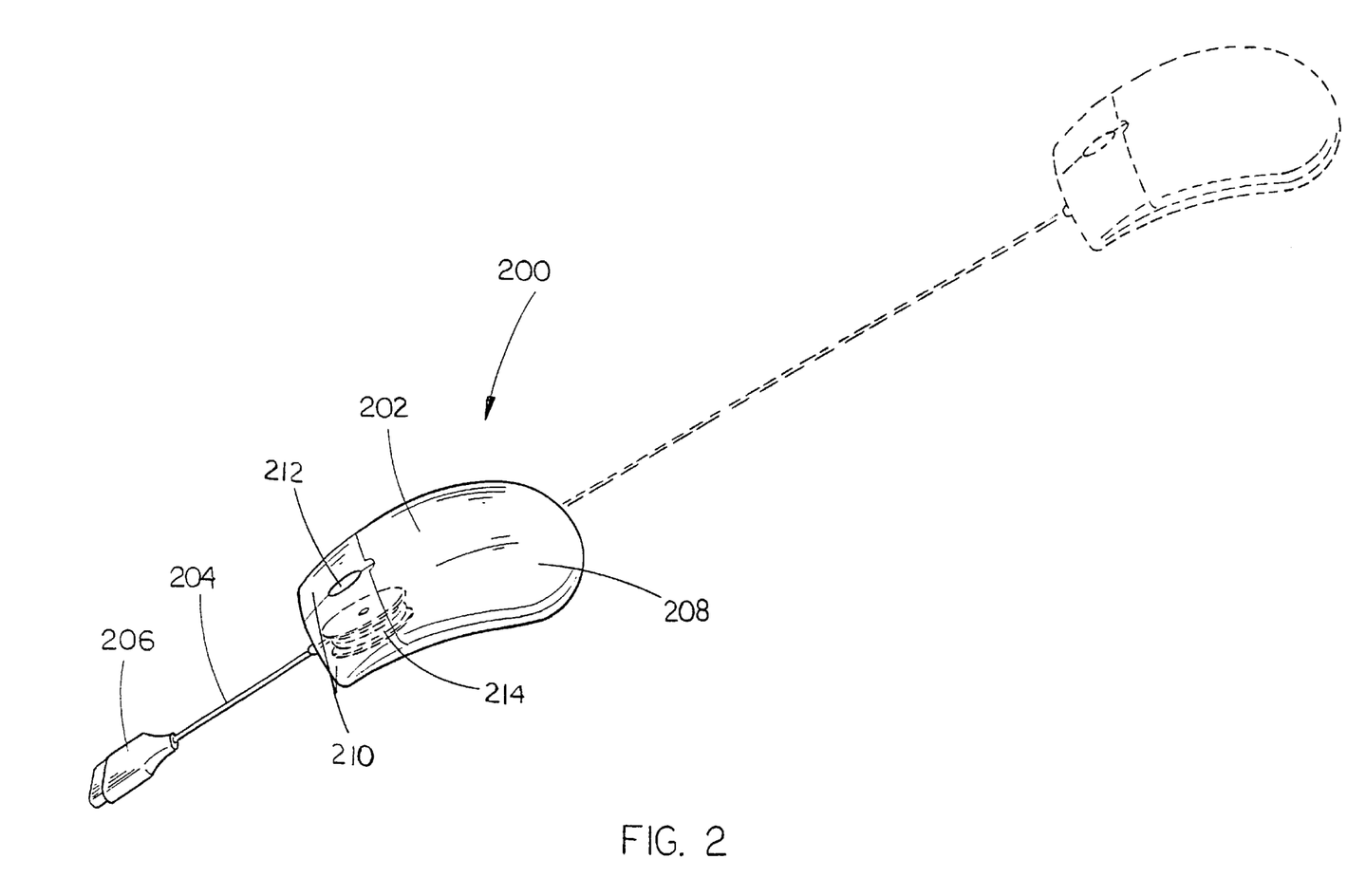
FIG. 2 is an isometric view of the peripheral input device shown in FIG. 1A.

Turning now to FIG. 2, a peripheral input device in accordance with an exemplary embodiment of the present invention is shown. The peripheral input device 200 may comprise an input device 202 (e.g., an absolute coordinate input device such as the mouse 110 shown in FIG. 1A) having a length of cord 204 and a connector 206 for coupling the body 208 of the input device 202 to the computer system (see FIG. 1A). The body 208 may have a curved upper surface which is preferably sized to fit within the palm area of a user's hand. One or more depressible keys 210 may be disposed on the upper surface at the front of the body 208. These keys 210 may be depressed by a user to input commands into the computer based on the position of the cursor displayed on the computer's display (see FIG. 1A). A wheel assembly 212 may be positioned on the upper surface of the body 208 adjacent to the keys 210. The wheel assembly 212 preferably comprises a wheel, extending above the upper surface of the body 208, which may be both rotated and depressed by a user. Specific functions provided by the wheel assembly 212 may be determined by the particular software being executed within the computer. For example, the wheel assembly 212 may control movement of the cursor in along a third axis (e.g., depth) in a graphics or drafting program, scroll text displayed by a word processing program, or move through commands displayed in a pull down menu by the operating system program.

The body 208 of the input device 202 may include a reel assembly 214 which allows the cord 204 to be extended and retracted between a fully extended length (shown as phantom lines) and a fully retracted length (shown as solid lines) as desired by the user. For example, the cord 204 may be retracted to its fully retracted length when the peripheral input device 200 is not be used so that the area around the computer does not appear cluttered or so that the cord 204 does not interfere with other tasks the user may wish to perform which do not involve use of the computer. The cord 204 may be extended from the fully retracted length to the fully extended length so that the peripheral input device 200 may be more easily used or manipulated by the user (e.g., moved over the surface 114 shown in FIG. 1A) to enter information and commands into the computer. Alternately, the cord 204 may be extended to and maintained at an intermediate length between the fully extended and fully retracted lengths so that the body 208 of the input device 202 may rest on a surface (e.g., the surface 114 shown in FIG. 1A) with a desired amount of slack in the cord 204 so that the peripheral input device 200 may be easily moved over that surface by the user.

Figure 3A:
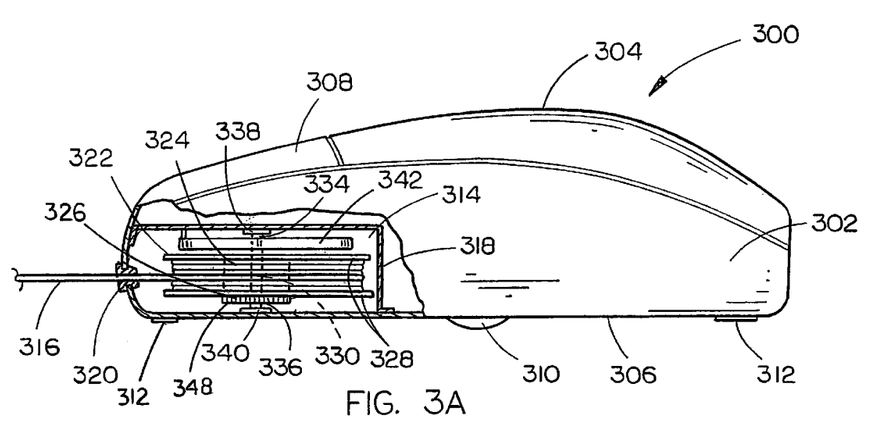
FIG. 3A is a partial cross-sectional side elevational view of the body of the peripheral input device illustrating detail of the reel assembly.
Figure 3B:
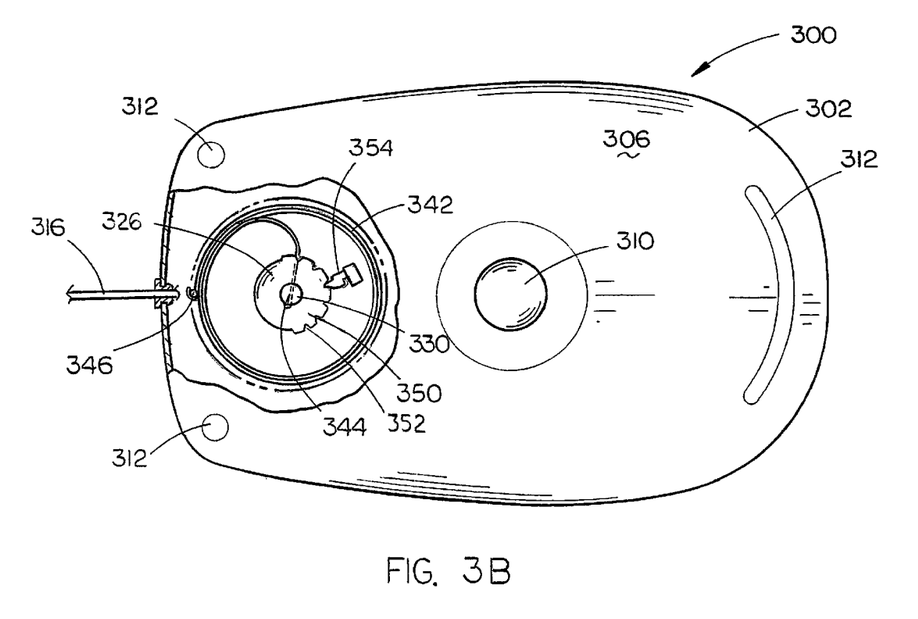
FIG. 3B is a partial cross-sectional bottom plan view of the body of the peripheral input device illustrating detail of the spring and stop mechanism.

Referring now to FIGS. 3A and 3B, the body of the input device is shown. The body 300 comprises a housing 302 having a curved upper surface 304 and a generally flat bottom surface 306. The upper surface 304 may include one or more depressible keys 308. A rotatable ball 310 may extend from the bottom surface 306 for contacting a work surface (e.g., surface 114 shown in FIG. 1A) whereupon movement of the body 300 across the work surface induces rotation of the ball 310. Electronic encoders (not shown) sense rotation of the ball 310, and generate a signal indicative of the ball's rotation to control movement of a cursor in the display area of the computer's display (see FIG. 1A). By depressing one of the keys 308, a user may enter various commands into the computer based on the location of the cursor within the display area. Preferably, selected areas 312 of the bottom surface 306 may be coated with a material for reducing friction between the bottom surface 308 and the surface over which the body 300 is being moved.

The body 300 may include a reel assembly 314 capable of alternately extending and retracting the cord 316 between a fully extended length and a fully retracted length (see FIG. 2). The reel assembly 314 preferably comprises a frame or housing 318 disposed within housing 302 of the body 300. The frame 318 may have an opening 320 coincident with an opening in the front of the housing 302 through which the cord 316 may extend. Disposed within the frame 318 is a rotatable spool 322 having a cylindrical drum 324 on which the cord 316 may be coiled. Side flanges 328 may extend from either side of the drum 324 for guiding the cord 316 onto the drum 324 as it is retracted. The spool 322 may be supported for rotation within the frame 318 by a shaft 330 which extends outwardly from the outer surfaces of the flanges 328 at their centers of rotation. The shaft 330 may have opposed first and second ends 334 & 336 retained within recesses 338 & 340 formed in the frame 318. Preferably, the first and second ends 334 & 336 of the shaft 330 may freely revolve within these recesses 338 & 340so that the shaft 330 and spool 322 may rotate within the frame 318.

A spring 342 may rotate the spool 322 so that the cord 316 may be wound or coiled about the drum 324 as it is retracted. As shown in FIG. 3B, the spring 342 may be a coiled spring having a first end 344 retained by the shaft 330 and a second end 346 retained by the frame 318. Preferably, as the cord 316 is extended from the body 300, the shaft 330 is rotated by the spool 322 causing the spring 342 to tighten and store potential energy for retracting the cord 316 at a later time.

The reel assembly 314 may further comprise a stop mechanism 348 which allows the cord 316 to be extended to and held at any of a plurality of lengths between its fully retracted length and its fully extended length (see FIG. 2). The stop mechanism 348 may also relieve tension in the cord 316 from the spring 342 so that the peripheral input device may be more easily used or manipulated. The stop mechanism 348 preferably operates to prevent the spring 342 from rotating the spool 318 (FIG. 3A) while the cord is extended. For example, the cord 316 may be manually extended from the body 300 against the force of the spring 342 and then stopped at a length desired by the user. Preferably, once extended, the stop mechanism 348 prevents the cord 316 from being retracted by the reel assembly 314. In this manner, tension in the extended length of the cord 316 caused by the reel assembly 314 attempting to retract the cord 316 may be eliminated. The extended length of the cord 316 may again be retracted into the body 300 of the peripheral input device by first applying an initial tension on the cord 316 (i.e., by pulling on the body 300 or the cord 316) and then releasing the tension to disengage the stop mechanism 348. Once the stop mechanism 348 is released, the spring 342 may exert a torsional force on the shaft 330 rotating the spool 322 and causing the cord to be wound or coiled onto the drum 324.

As shown in FIG. 3A, the stop mechanism 326 may comprise a clutch 348 which may engage the outer surface of a flange 328 of the spool 322. While engaged, the clutch 348 prevents the spool 322 from being rotated by the spring 342 thus holding the cord 316 at an extended length. The user may disengage the clutch plate 348 from the flange 328 by depressing a button disposed on the peripheral input device's body 300 (not shown). Preferably, while the button is depressed, the cord may be extended against the force of the spring 342 by the user, or, alternately, retracted by allowing the spring 342 to rotate the spool 322 to coil the cord onto the drum 324.

As shown in FIG. 3B, the stop mechanism 326 may alternatively comprise a disk 350 having a plurality of notches 352 spaced about it periphery. A flexible pawl 354 may engage a notch 352 of the disk 350 whereupon the disk 350 and flexible pawl 354 may cooperate to prevent the spool 322 from being rotated by the spring 342. Preferably, the disk 350 is affixed to the shaft 330 so that its center is coincident with the center of the spool 322 wherein the disk 350 may turn in concert with the spool as the spool 322 is rotated by the spring 342. The flexible pawl 354 may have an outer end retained by the frame 318 and an inner end including a front face having a tip sized and shaped to engage a notch 350 in the disk 348 when the stop mechanism 348 is engaged, and a curved rear face forming a cam surface which slides against the periphery of the disk 350 when the stop mechanism 348 is disengaged and the cord 316 is being retracted.

In FIG. 3B, the flexible pawl 354 is shown engaged within a notch 352 of the disk 350 so that the stop mechanism 348 is engaged and the spool 322 is prevented from rotating. To disengage the stop mechanism 348 and retract the cord 316 into the body 300 of the peripheral input device, the cord 316 may first be extended a slight amount. This causes rotation of the spool 322 and the disk 350 against the force of the spring 342 and moves the tip of the flexible pawl 354 out of the notch 352 in the disk 350. The cord 316 is then released so that the spring 342 may rotate the spool 322 to coil the cord 316 onto the drum 324. As the spool 322 rotates, the pawl 354 flexes causing its curved rear face to contact the disk 350 and its tip to pass over the notches 350 without engaging them. To extend the cord 316 from the body 300, the cord 316 is pulled outwardly until the desired length is exposed. The cord 316 may then be slowly reversed causing the pawl 352 to engage a notch 350 in the disk 348.

Because the cord 316 is retracted into the body 300 of the peripheral input device, the peripheral input device of the present invention may be utilized with any computer having the ability to accept commands inputted via a peripheral input device. Although a conventional desk top computer has been described herein in FIG. 1A, it should be recognized that the peripheral input device of the present invention may be utilized with other types of information processing apparatus such as, for example, a portable computer, a digital personal organizer, or a personal digital assistant (PDA).

Referring now to FIGS. 4, 5, 6, 7, and 8, computer systems employing peripheral input devices having retractable cords in accordance with exemplary embodiments the present invention are shown.

Figure 4:
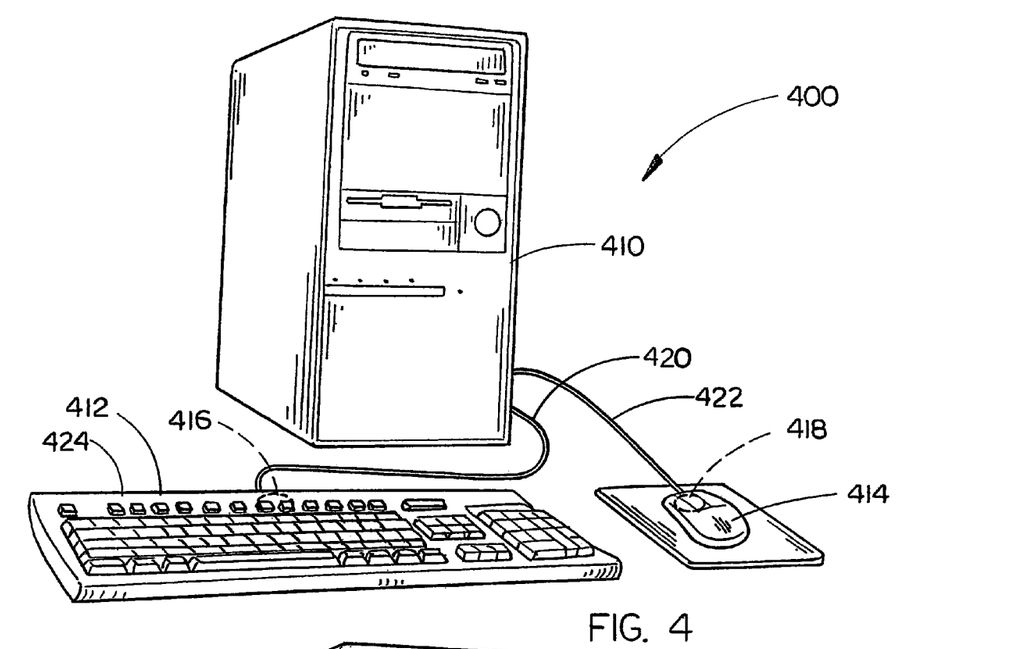
FIG. 4 is an isometric view of a computer system including keyboard and mouse peripheral input devices each having a reel assembly in accordance with an exemplary embodiment of the present invention.

As shown in FIG. 4, the computer system 400 may include multiple peripheral input devices such as keyboard 412 and mouse 414 for entering information and commands into the computer 410. Preferably, the keyboard 412 and mouse 414 are each coupled to the computer 410 via a cord or cable 420 & 422. The keyboard 412 may include a reel assembly 416 contained within its body 424. Preferably, this reel assembly 416 operates like the reel assembly 314 of the peripheral input device 200 described, supra, in connection with FIGS. 2, 3A and 3B to retract the keyboard's cord 420 within the body 424 of the keyboard 412. Similarly, the mouse 414 may include a reel assembly 418 for retracting its cord 422 as described, supra, in connection with FIGS. 2, 3A and 3B.

Figure 5:
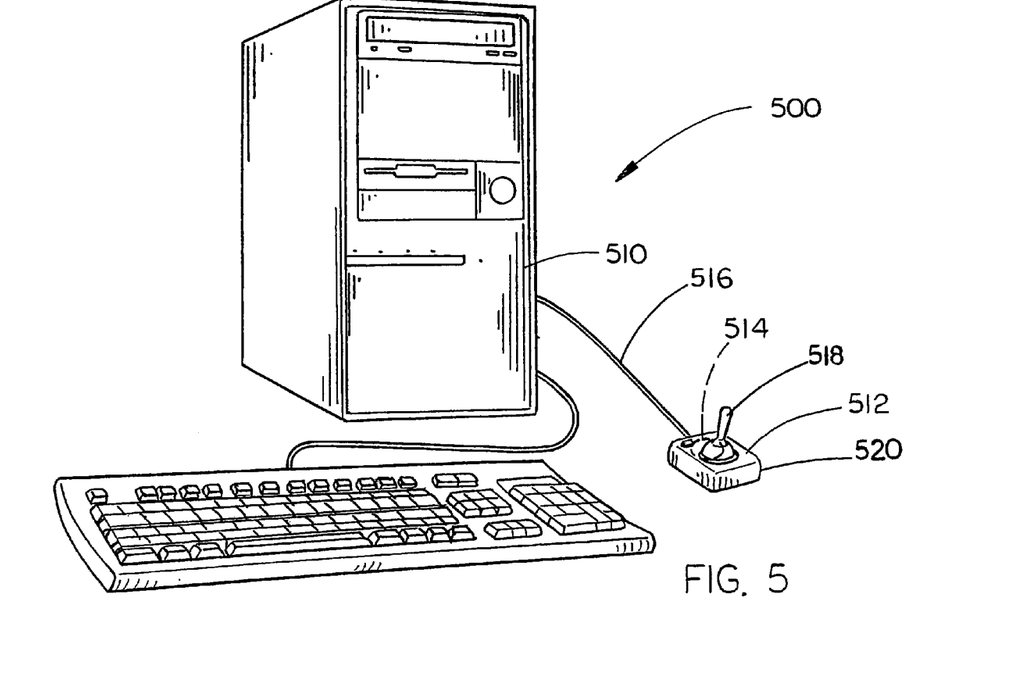
FIG. 5 is an isometric view of a computer system including a pointing stick type peripheral input device having a reel assembly in accordance with an exemplary embodiment of the present invention.

Turning now to FIG. 5, the computer system 500 may include a pointing stick type absolute coordinate input device 512 (typically referred to in the art as a "pointstick" or "joystick") coupled to the computer 510 via a cord or cable 516. This input device 512 includes a stick or shaft 518 which may be pressed in a desired direction by a user of the computer system 500. Force sensors (not shown) such as force-sensitive resistors, strain gauges, or the like may be coupled to the shaft 518 for sensing forces applied to the shaft 518 by the user. These force sensors generate a signal which causes a cursor displayed on the display of the computer system 500 (see FIG. 1A) to be moved in a corresponding direction. The input device 512 may include a reel assembly 514 contained within its body 520. Preferably, this reel assembly 514 operates like the reel assembly 314 of the peripheral input device 200 described, supra, in connection with FIGS. 2, 3A and 3B to retract the controller's cord 516 within its body 520.

Figure 6:
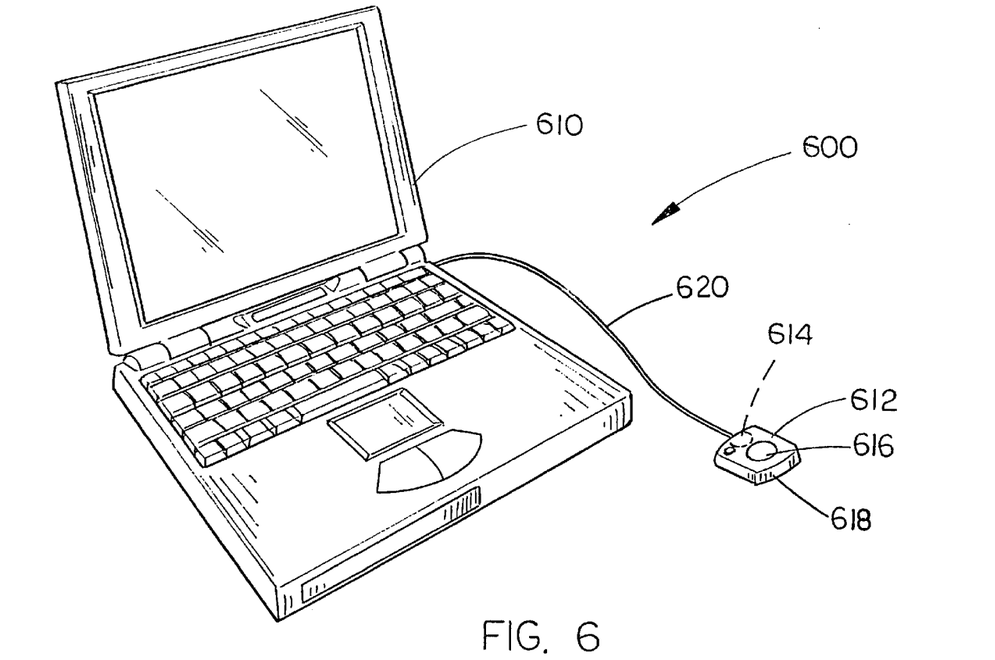
FIG. 6 is an isometric view of a portable computer system including a trackball type peripheral input device having a reel assembly in accordance with an exemplary embodiment of the present invention.

Referring now to FIG. 6, the computer system 600 may alternately include a rotating ball type absolute coordinate input device or "trackball" 612. As shown in FIG. 6, the computer system 600 may be a portable computer 610 commonly referred to as a laptop or notebook computer instead of the conventional computer system depicted in FIG. 1A. It should be recognized that embodiments of the peripheral input device of the present invention may be utilized with a portable or conventional computer system (as shown herein), a workstation of a networked or mainframe computer system, or the like without departing from the spirit and scope of the invention.

The trackball 612 includes a ball 616 which is freely rotatable in all directions. When a user of the computer system 600 rotates the ball 616, electronic encoders (not shown) sense the rotation and generate a signal indicative of the ball's rotation to control movement of a cursor displayed on a display (see FIG. 1A) of the computer system 600. The trackball 612 may include a reel assembly 614 contained within its body 618 for retracting the cord or cable 620 coupling the trackball 612 to the computer 610. Preferably, this reel assembly 614 operates like the reel assembly 314 of the peripheral input device 200 described, supra, in connection with FIGS. 2, 3A and 3B to retract the trackball's cord 620 within its body 618.

Figure 7:
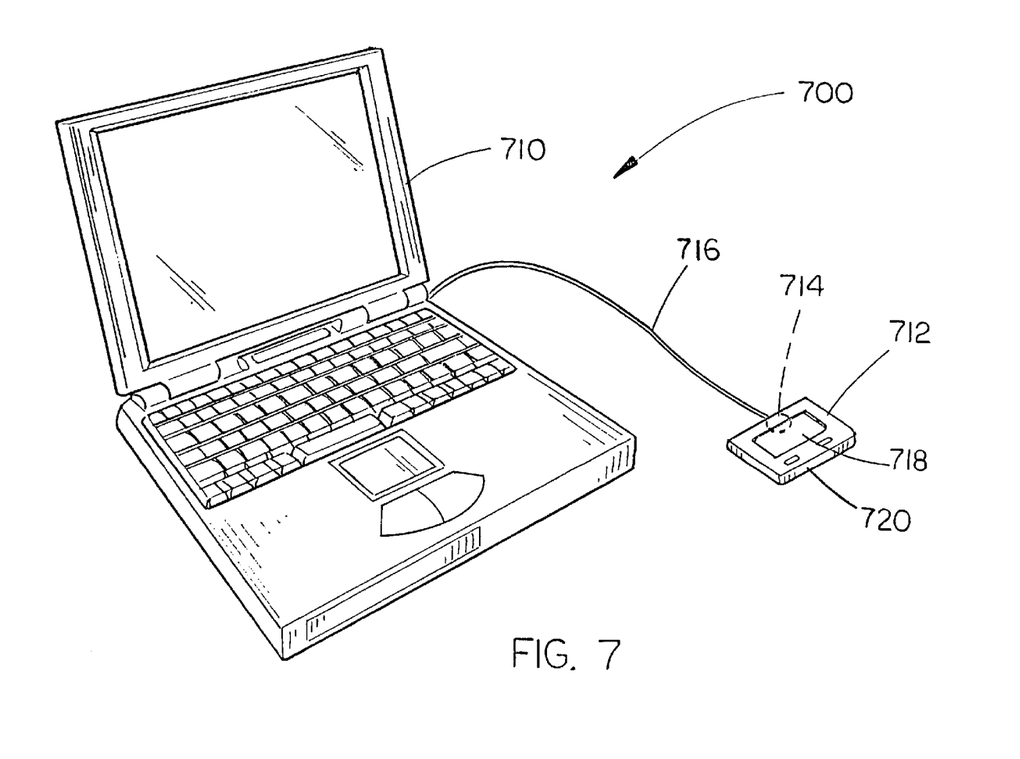
FIG. 7 is an isometric view of a portable computer system including a trackpad type peripheral input device having a reel assembly in accordance with an exemplary embodiment of the present invention.

Turning now to FIG. 7, the computer system 700 may further include a touch sensitive absolute coordinate input device or "touchpad" 712 coupled to the computer 710 via a cord or cable 716. The touchpad 712 may include a touch sensitive surface 718 which is responsive to forces induced therein by a stylus (not shown) or the fingertip of a user of the computer system 700. By sliding a stylus or his or her fingertip in a desired direction over the surface 718, the user may cause a cursor displayed on a display (see FIG. 1A) of the computer system 700 to be moved in a corresponding direction. The touchpad 712 may include a reel assembly 714 for retracting the cord 716 into the body 720 of the touchpad 712. Preferably, the reel assembly 714 operates like the reel assembly 314 of the peripheral input device 200 described, supra, in connection with FIGS. 2, 3A and 3B. This allows the cord 716 to be retracted or extended as desired a user of the computer system 700.

Figure 8:
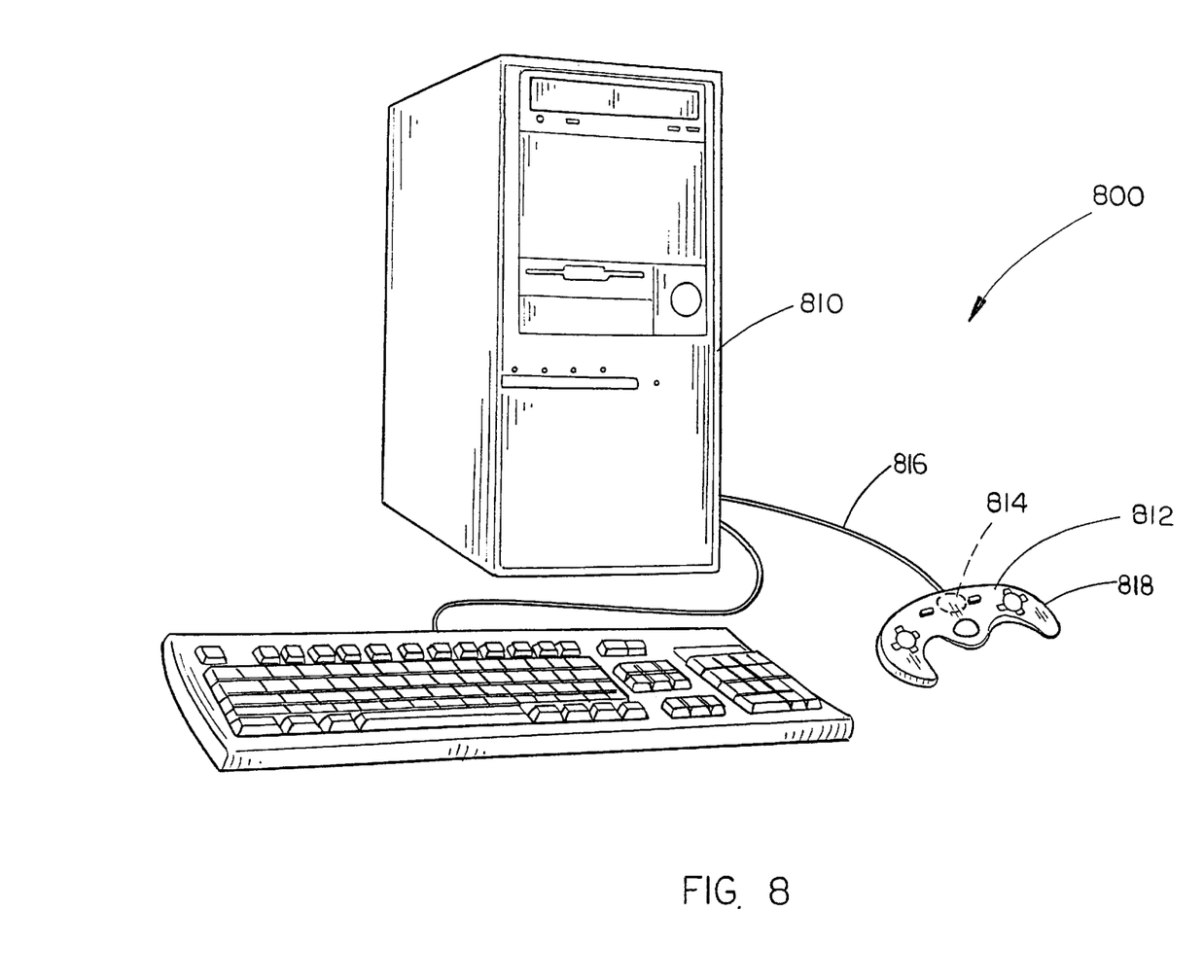
FIG. 8 is an isometric view of a computer utilizing a game controller type peripheral input device having a reel assembly in accordance with an exemplary embodiment of the present invention.

Turning now to FIG. 8, the computer system 800 may include, as a peripheral input device, a game controller 812 having assorted controls for controlling the functions of a video game program executed by the computer system 800. The game controller 812 may include a reel assembly 814 for retracting the cord 816 (interconnecting the controller 812 to the computer 810) into the body 818 of the controller 812. Preferably, the reel assembly 814 operates like the reel assembly 314 of the peripheral input device 200 described, supra, in connection with FIGS. 2, 3A and 3B. This allows the cord 816 to be retracted or extended as desired a user of the computer system 800.

It is believed that the peripheral input device of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A peripheral input device for a computer system comprising:
   an input device for inputting information into the computer system;
   a cord for operatively coupling the input device to the computer system; and
   a reel assembly disposed in the input device, the reel assembly for alternately extending and retracting the cord from the input device between a first length and a second length.

2. The peripheral input device of claim 1, wherein the reel assembly comprises:
   a spool rotatably disposed within the input device for receiving the cord; and
   a spring coupled to the spool, the spring for rotating the spool to receive the cord wherein the cord is at least partially coiled about the spool when the cord is retracted between the first length and the second length.

3. The peripheral input device of claim 2, wherein the spring comprises a spiral coiled spring having an inner end attached to the spool and an outer end attached to the input device wherein the spring is tightened as the cord is extended.

4. The peripheral input device of claim 2, wherein the reel assembly further comprises a stop mechanism coupled to the spool, the stop mechanism for engaging the spool to prevent the spring from rotating the spool to receive the cord.

5. The peripheral input device of claim 1, further comprising a connector attached to the cord opposite the input device for operatively coupling the cord to the computer system.

6. The peripheral input device of claim 1, wherein the input device is a keyboard type input device.

7. The peripheral input device of claim 1, wherein the input device is an absolute coordinate input device.

8. The peripheral input device of claim 7, wherein the absolute coordinate input device is a mouse.

9. The peripheral input device of claim 8, further comprising one or more depressible keys disposed on the input device, the one or more depressible keys for inputting commands into the computer system based the position of a cursor displayed on the display.

10. The peripheral input device of claim 9, further comprising a wheel assembly disposed on the input device, the wheel assembly operable by a user for inputting commands into the computer system based the position of a cursor displayed on the display.

11. The peripheral input device of claim 8, further comprising a rotatable ball extending from a bottom surface of the input device for contacting the surface such that movement of the input device over the surface causes rotation of the ball to provide the position indications.

12. The peripheral input device of claim 8, having a curved upper surface shaped for comfortably fitting within the hand of a user.

13. The peripheral input device of claim 7, wherein the absolute coordinate input device comprises a trackball.

14. The peripheral input device of claim 7, wherein the absolute coordinate input device comprises a pointing stick.

15. The peripheral input device of claim 7, wherein the absolute coordinate input device comprises a touch sensitive surface.

16. The peripheral input device of claim 1, further comprising a connector attached to the cord opposite the input device for operatively coupling the cord to the computer system.

17. A peripheral input device for a computer system comprising:
   a body movable over a surface for controlling the position of a cursor displayed on a display of the computer system, the body including one or more depressible keys disposed thereon for inputting commands into the computer system based the position of the cursor;
   a cord capable of being operatively coupling the body to the computer system; and
   a reel assembly disposed in the body for receiving the cord, the reel assembly for alternately extending and retracting the cord from the body between a first length and a second length.

18. The peripheral input device of claim 17, wherein the reel assembly comprises:
   a spool rotatably disposed within the body for receiving the cord; and
   a spring operatively coupled to the body and the spool, the spring for rotating the spool to receive the cord wherein the cord is at least partially wound around the spool when the cord is retracted between the first length and the second length.

19. The peripheral input device of claim 18, wherein the spring comprises a spiral coiled spring having an inner end attached to the spool and an outer end attached to the body wherein the spring is tightened as the cord is extended.

20. The peripheral input device of claim 18, wherein the reel assembly further comprises a stop mechanism coupled to the spool and the body for engaging the spool to prevent the spring from rotating the spool to receive the cord.

21. The peripheral input device of claim 17, further comprising a connector attached to the cord opposite the body for operatively coupling the cord to the computer system.

22. The peripheral input device of claim 17, further comprising a rotatable ball extending from a bottom surface of the body for contacting the surface such that movement of the body over the surface causes rotation of the ball to control movement of the cursor on the display.

23. The peripheral input device of claim 17, further comprising a wheel assembly disposed on the body, the wheel assembly rotatable by a user for inputting commands into the computer system.

24. The peripheral input device of claim 17, having a rounded upper surface shaped to comfortably fit within the hand of a user.

25. A peripheral input device for a computer system comprising:
   means for inputting information into a computer system;
   means for coupling the information inputting means to the computer system; and
   means, disposed in the information inputting means, for extending and retracting the coupling means from the information inputting means.

26. The peripheral input device of claim 25, wherein the information inputting means comprises means for controlling the position of a cursor displayed on a display of the computer system.

27. The peripheral input device of claim 25, further comprising means for preventing the means for alternately extending and retracting the coupling means from retracting the coupling means.

28. The peripheral input device of claim 25, further comprising means for inputting commands into the computer system.

29. A computer system comprising:

a central processing system for processing information;

a memory interconnected with the central processing system for storing information;

a display system interconnected with the central processing system for displaying information;

an input/output system interconnected with the processing system; and a peripheral input device operatively coupled to the input/output system, the peripheral input device further comprising:

an input device for inputting information into the computer system;

a cord for operatively coupling the input device to the computer system; and     a reel assembly disposed in the input device, the reel assembly for alternately extending and retracting the cord from the input device between a first length and a second length.

30. The computer system of claim 29, wherein the reel assembly comprises:

a spool rotatably disposed within the input device for receiving the cord; and     a spring coupled to the spool, the spring for rotating the spool to receive the cord wherein the cord is at least partially coiled about the spool when the cord is retracted between the first length and the second length.

31. The computer system of claim 30, wherein the spring comprises a spiral coiled spring having an inner end attached to the spool and an outer end attached to the input device wherein the spring is tightened as the cord is extended.

32. The computer system of claim 30, wherein the reel assembly further comprises a stop mechanism coupled to the spool, the stop mechanism for engaging the spool to prevent the spring from rotating the spool to receive the cord.

* * * * *